United States Patent [19]

Kelly, Jr.

[11] 4,340,029
[45] Jul. 20, 1982

[54] PORTABLE SOLDERING IRON HEATER SYSTEM

[75] Inventor: Thomas J. Kelly, Jr., Mandeville, La.

[73] Assignee: Kel-Co Industries, Inc., Mandeville, La.

[21] Appl. No.: 179,714

[22] Filed: Aug. 20, 1980

[51] Int. Cl.$^3$ .......................... F24C 3/00; F24C 5/00
[52] U.S. Cl. ..................................... 126/237; 126/239
[58] Field of Search ............... 126/414, 413, 409, 237, 126/239, 229, 401, 403, 236; 228/53; 431/344

[56] References Cited

U.S. PATENT DOCUMENTS

| | | | |
|---|---|---|---|
| 364,986 | 6/1887 | Burgess | 126/236 |
| 883,216 | 3/1908 | Lundy | 126/239 |
| 942,245 | 12/1909 | Burgess | 126/237 |
| 1,055,967 | 3/1913 | Denicke | 126/239 |
| 1,108,436 | 8/1914 | Johnston | 126/239 |
| 2,861,562 | 11/1958 | Ross et al. | 126/38 |
| 3,724,444 | 4/1973 | Varona | 126/237 |

Primary Examiner—Samuel Scott
Assistant Examiner—Randall L. Green
Attorney, Agent, or Firm—C. Emmett Pugh and Associates

[57] ABSTRACT

A light weight, portable, and self-contained soldering iron heating device in which one or more propane gas containers or equivalent provide fuel to two burners through a manifold which has independent burner fuel controls. The burners are located in a fire box which supports a cradle in which two soldering irons may be placed. The fire box is fitted with a hinged hood, provides for rapid and economical heating, and confines the flame so as to be safe for use in areas selected for soldering, with the hinged hood providing easy access to the burners for servicing. The fuel supply and fire box are positioned side-by-side on a horizontal base and are separated by an integral, vertical, combined sheet metal, heat shield and tubular handle. This configuration eliminates the need for any insulation, results in a low center of gravity allowing use on inclines up to for example thirty degrees, and permits single hand carriage.

14 Claims, 3 Drawing Figures

PORTABLE SOLDERING IRON HEATER SYSTEM

BACKGROUND OF THE INVENTION

1. Field of the Invention

This invention relates to improvements in soldering iron heating devices and in particular to light weight, portable, self-contained furnaces or fire pots which are compact, easily refueled, economically and rapidly heated and fired by for example bottled gas.

2. Prior Art

The art of soldering together two separate metals with a metal of lesser melting point requires a large quantity of heat in order to bring the areas to be joined on the two separate metals up to a temperature in excess of the melting point of the soldering metal.

For this purpose sheet metal workers have consistently used a combustible fuel heated furnace to heat manual or hand-held soldering irons.

Most of the portable soldering iron furnaces or fire pots in use today for heating hand-held soldering irons are charcoal fired. These furnaces are troublesome, wasteful and expensive and involve such difficulties as the initial lighting of the charcoal, the maintaining of the fire at the desired heat output for an extended period, the extinguishing of the charcoal, the disposing of the fuel residue and the breathing of toxic fumes.

Other approaches have been considered such as gasoline (note for example U.S. Pat. No. 942,245, to E. T. Burgess, issued Dec. 7, 1909) or gas (note for example U.S. Pat. No. 1,024,320 to R. Eisenberg, issued Apr. 23, 1912; U.S. Pat. No. 1,088,230 to C. J. Johnson, issued Feb. 24, 1914; U.S. Pat. No. 1,401,514 to J. Blake, issued Dec. 27, 1921; U.S. Pat. No. 1,497,104 to E. H. Lamb, issued June 10, 1924; U.S. Pat. No. 3,724,444 to P. G. Varona, issued Apr. 3, 1973) or a standard blow torch (note for example U.S. Pat. No. 1,432,801 to M. V. Street, issued Oct. 24, 1922). With the exception of U.S. Pat. No. 3,724,444, all of these types of furnaces failed to adequately solve all of the fuel supply difficulties of the prior art. In addition, those which proved to be inadequate were not truly compact and portable, were clumsy to use or presented a dangerous explosive hazard.

U.S. Pat. No. 3,724,444 to P. G. Varona, issued Apr. 3, 1973, did present a readily portable soldering iron furnace which overcame the fuel supply difficulties of the prior art where other attempts had failed. However, the device requires separate insulation, has a substantially different configuration and weight distribution and has only a single heat source.

The present invention provides an alternate solution to the difficulties of the prior art. This alternate solution is new, is not obvious to one skilled in the art and is of great utility.

SUMMARY DISCUSSION OF INVENTION

It is an object of this invention to provide a light weight, readily portable and self-contained soldering iron heating device which provides for rapid and economical heating, which confines the flame so as to be safe for use in areas selected for soldering and which provides easy access to the burners for servicing. It is a further object to provide a furnace with a low center of gravity thereby permitting its use on inclines up to for example thirty degrees. A still further object of the present invention is to provide such a device without the need for the usual fire box insulation and yet have the fuel supply safely isolated from the heat of the firebox.

BRIEF DESCRIPTION OF THE DRAWINGS

Other objectives and advantages of the present invention and a full understanding thereof may be had by referring to the following description and claims taken together with the accompanying drawings, briefly described below.

DESCRIPTION OF THE PREFERRED EMBODIMENT

Figure 1:
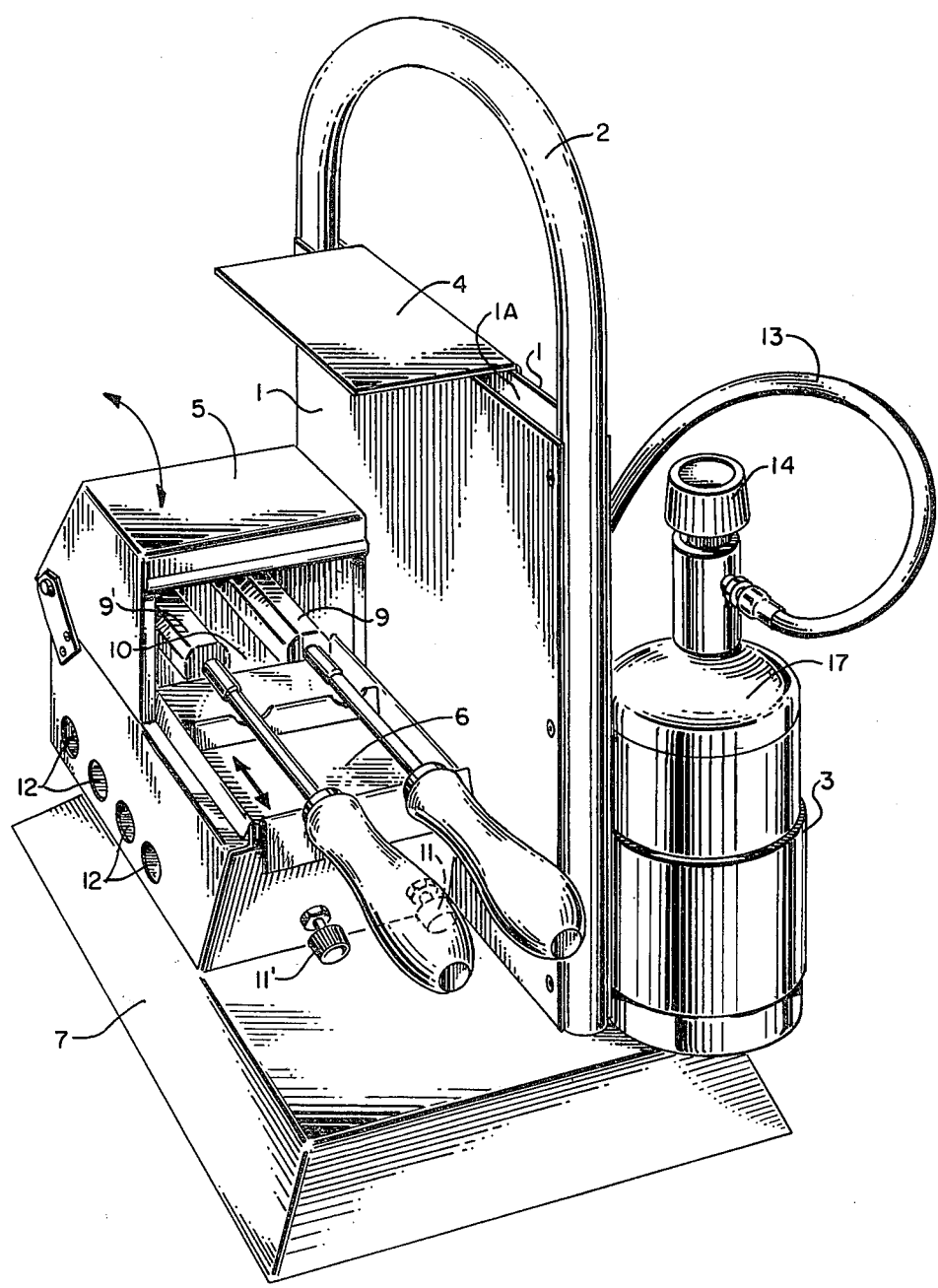
FIG. 1 is a perspective, front view of the preferred embodiment of the soldering iron heating device of the present invention depicting its overall characteristics.
Figure 3:
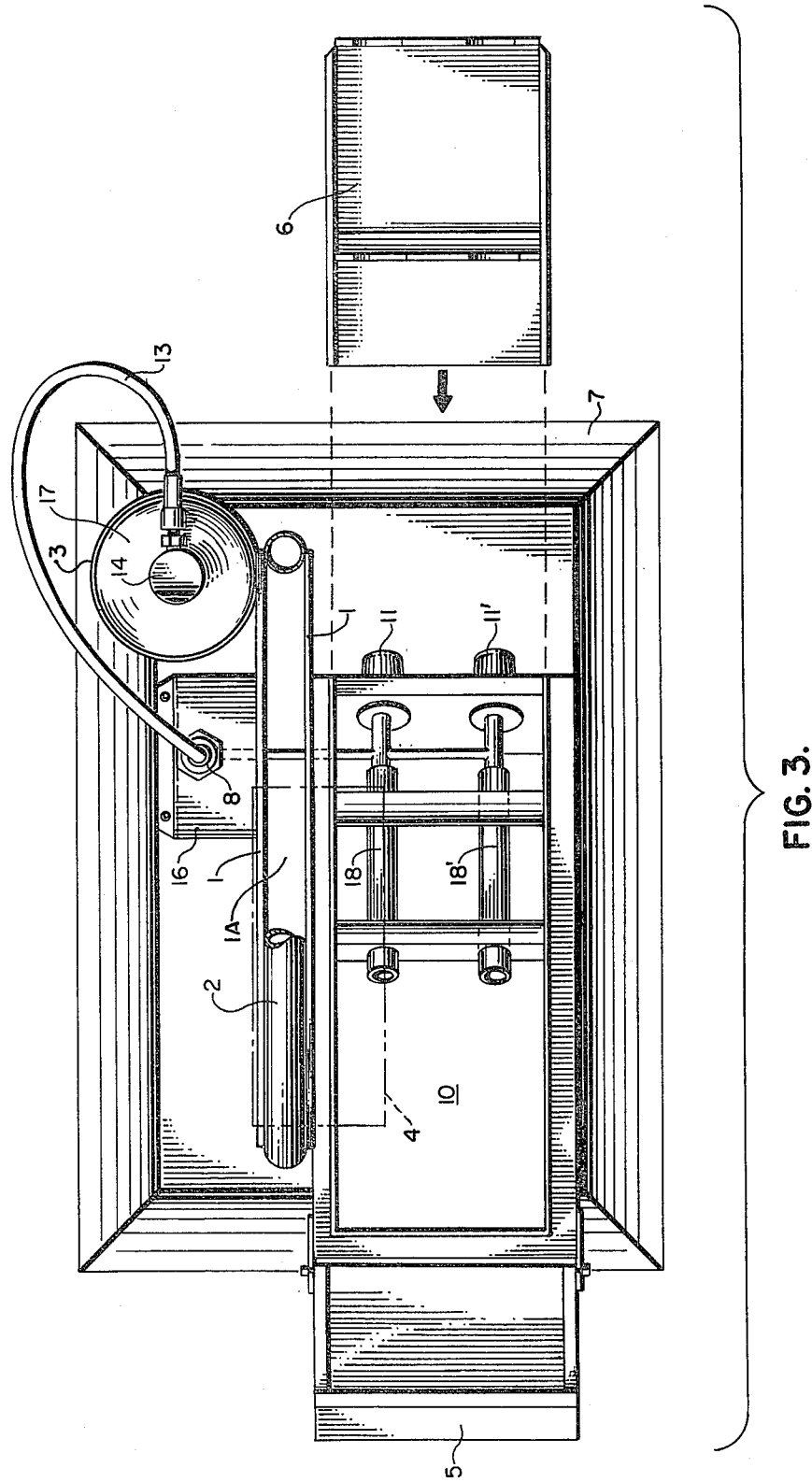
FIG. 3 is a top view of the embodiment of FIG. 1 but with the irons and cradle removed and the cover raised to reveal the burner arrangement with part of the handle cut-away to reveal the insulating air gap.

The preferred embodiment of the light weight, portable and self-contained soldering iron heating device of the present invention, having soldering irons being heated therein, is shown in FIGS. 1 and 3.

Figure 2:
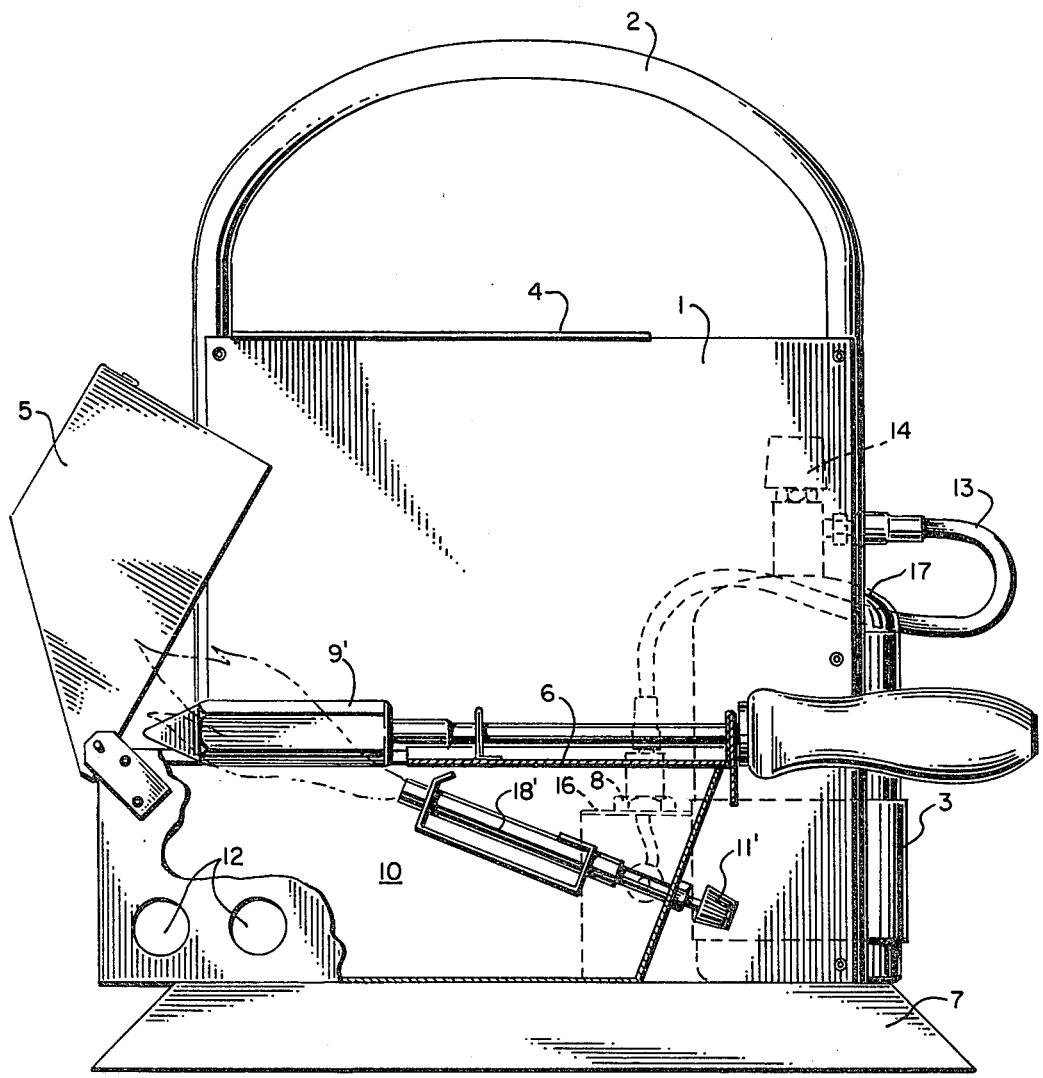
FIG. 2 is a side elevation view of the embodiment of FIG. 1 but with a partial cut-away of the furnace revealing the burner arrangement and with the cover raised.

As illustrated in FIGS. 1-3, the light weight, portable, self-contained and statically balanced sheet metal structure is supported by a flared rectangular base 7, measuring for example approximately sixteen inches long by ten inches wide by one and one-half inches high. The base supports a side-by-side configuration which is characterized by a centrally located, laterally and vertically extending, integral handle 2 and heat shield 1 which incorporates an air gap 1A which enhances the insulating properties of the heat shield 1. The integral handle 2 and heat shield 1 measure for example approximately eighteen inches tall. To one side of the integral handle 2 and heat shield 1 is placed the fire pot or furnace 10, and to the other side is placed the fuel supply 17.

The entire sheet metal structure, with the exception of the hinged furnace cover 5, may be fabricated using for example twenty-six gauge, 0.0217 inch mean thickness, 0.91 pound per square foot, galvinized steel which provides lightness without sacrificing durability or strength. The hinged furnace cover 5 may be fabricated using for example eighteen gauge, 0.0516 inch mean thickness, 2.156 pound per square foot galvinized steel, which provides enhanced furnace efficiency and user protection.

It should be noted that the arrangement and structure disclosed allow the standard wall insulation material, of for example abestos cement, to be eliminated in the fire box structure (cf. insulation 2' in Varona U.S. Pat. No. 3,724,444). Additionally, including two spaced pieces of sheet material 1 secured to opposite sides of the handle 2, produces an extra strong and reliable structure. It should be noted that the shield sheets 1 extend up only a part of the way to the top of the handle 2, leaving an opening for gripping the handle 2 which preferably has the shape of an inverted "U".

The fuel supply 17 is a standard tank containing propane. The tank dimensions may be for example approximately six inches tall by approximately four inches in diameter. The fuel supply tank is fitted with a main shut off valve 14 to prevent leakage of the propane when the unit is not being used, as an added measure of safety. The main shut off valve 14 supplies propane through a flexible hose 13 to a two valve manifold 11 and 11' through connector 8 located on sheet metal box 16. Each valve 11,11' operates independently of the other and controls the flow of propane to its respective open nozzle burner 18, 18'. Individually adjustable open nozzle burners 18,18' are provided for the optimum selection of heat input to each soldering iron 9, 9' for the conservation of fuel. The two valve manifolds 11, 11' and open nozzle burners 18, 18' are easily accessible by raising the hinged furnace cover 5 (note FIG. 2), and by removing the cradle 6 open (note FIG. 3) which supports the soldering irons 9, 9'.

The fuel supply standard tank 17 is housed in an upright position in a circular sleeve 3 to one side of the integral handle 2 and insulating shield 1. As can be seen in the figures, the fuel tank supply sleeve area 3 is located at the opposite end of the unit from the burners 18,18'. This positioning with the heat shield 1 insulates the fuel supply from the heat outputs of the open nozzle burners 18, 18', makes the fuel supply tank 17 easily accessible to facilitate its changing, and enhances the compactness, stability and low center of gravity of the unit.

The furnace 10 is positioned on the opposite side of the integral handle 2 and insulating shield 1 from the fuel supply tank 17. The furnace 10 houses the two independently controlled, open-nozzle burners 18, 18' and supports a removeable cradle 6 upon which two soldering irons (as illustrated in FIG. 1) may be placed. The furnace 10 is fitted with a hinged cover 5 which entraps the heat outputs of the open nozzle burners 18, 18', thereby enhancing the efficiency of the furnace 10, and encloses the flame and the hot soldering iron 9, thereby enhancing the safety of the device. The opening of the hinged furnace cover 5 and the removal of the cradle 6 provides easy access to the open nozzle burners, 18, 18'. The base of the furnace 10 is outfitted with ventillation openings 12 to insure a sufficient supply of air to the open nozzle burners 18, 18' and thereby enhance the furnace efficiency. The open nozzle burners 18, 18' are positioned on an incline so that their flames will impinge directly upon the tips of the soldering irons 9, 9' open (FIG. 2).

The integral handle 2 and insulating shield 1 is positioned laterally and centrally, basically end-to-end, to provide balance so that the unit may be readily carried with one hand. Extended, vertically disposed, sheet metal shields 1 are fitted to both sides of the tubular handle 2, thereby creating an air gap 1A between them, which enhances the insulating properties of the heat shield 1. This configuration provides efficient insulation of the fuel supply tank 17 from the radiated heat of the furnace 10 and furnace cover 5. A supplemental, horizontally disposed, projecting heat shield 4 extends over the furnace cover 5 and insulates the handle 2 from the radiated heat of the furnace cover 5.

The operation of the furnace is initiated by opening the main shut off valve 14, inserting a lighted match into the furnace 10 at the tip of the open nozzle burner 18 or 18', and opening the appropriate manifold valve 11 or 11' slightly until the flame is ignited. The manifold valves 11, 11' may be adjusted to obtain the desired flame impingement upon the soldering irons 9, 9', respectively.

Variations in the preferred embodiment of the light weight, portable, self-contained soldering iron heating device of the present invention are of course possible, and some examples are set out below:

A single sheet metal insulating shield 1 fitted to only one side of the tubular handle 2 could be used although such would not have the preferred air gap;

A tubular handle 2 which is integral with the heat shield 1, and is of other than a curved configuration, for example a square configuration, could be used;

The fuel supply tank 17 could be mounted in a horizontal position rather than vertically as shown;

Multiple fuel supply tanks 17, for example two, which are fitted with a T-manifold to which is fitted a flexible supply hose, could be used providing back-up fuel supplies;

A furnace cover 5, which is fitted to the furnace 10 by means other than hinges, for example by means of tongue and groove slides could be used; and Any multiple number of independently controlled, open nozzle burners 18 positioned beneath a removable cradle 6, which supports a commensurate number of soldering irons 9, and, could also of course be used.

Insulating material having a relatively high "R" factor could be included in the air gap for even greater heat isolation and insulation of the fuel supply from the fire box and its burners.

Because the invention is capable of many different embodiments and of being practiced and carried out in various ways, it should be understood that the invention is not limited in its application to the details and arrangements of parts illustrated in the accompanying drawings. It should also be understood that the phraseology and terminology employed herein is merely for the purpose of description and not of limitation, and it is not intended to limit the invention claimed herein beyond the requirements of the prior art.

What is claimed is:

1. A portable and self-contained heating device for heating soldering irons and the like, comprising:
   a support base;
   a fire box containing at least one burner forming a furnace to heat at least one soldering iron located on one side of said base;
   a replaceble fuel supply tank area located on a side of said base opposite from that of said fire box from which area fuel is supplied to said burner;
   laterally extending heat shield means associated with said base between said fuel supply area and said fire box, said shield means comprising an upwardly extending member having an extended surface extending both laterally and upwardly, for separating physically the side-by-side configured fuel supply area and fire box and for protecting the fuel supply area from the radiated heat of said fire box; and
   a carrying handle attached to said base and positioned centrally for balance so that the unit may be readily carried with one hand.

2. The heating device of claim 1 wherein said handle and said laterally extending heat shield means are connected together forming an integral structure.

3. The heating device of claim 1 wherein there is further included horizontally extending heat shield means associated with said handle for protecting said handle from heat radiated by the furnace and for providing protection to the furnace from chilling down drafts.

4. The heating device of claim 1 wherein there is a multiple number of burners and there is further included multiple valve manifold means associated with said fuel supply tank area for controlling the flow of fuel to each burner for permitting an optimum selection of heat input to each soldering iron and for conserving fuel.

5. The heating device of claim 1 wherein there is further included a removable cradle on said furnace upon which at least one soldering iron may be placed, a moveable cover forming a part of said fire box and entraping the heat output of said nozzle burner, enclosing the burner flame and the soldering iron tip and providing access to the nozzle of said burner, and ventillation openings provided in said fire box assuring an adequate air supply to said burner.

6. The heating device of claim 1 wherein said fuel supply tank area is open and easily accessible to facilitate the changing of spent fuel supply tanks.

7. The heating device of claim 2 wherein said handle form an inverted at least generally U-shaped configuration, and said laterally extending heat shield means comprises two sheets of sheet material extended laterally across and connected to said handle, one on each side thereof forming a gap between them.

8. The heating device of claim 7 wherein air fills said gap.

9. The heating device of claim 7 wherein said sheet material is sheet metal and said sheet material extends only partially up the inverted U-shaped configuration leaving an opening around said handle at the top thereof to serve as the hand griping portion of said handle.

10. The heating device of claim 1 wherein said fuel supply tank area positions the fuel supply tank at least partially above the vertical level of the heating nozzle of said burner during use of the device.

11. The heating device of claim 10 wherein there is included an area for only one fuel supply tank and that area is located at the end of said base opposite to that of said burner.

12. A portable and self-contained heating device for heating soldering irons and the like, comprising:
  a support base;
  a fire box containing at least one burner forming a furnace to heat at least one soldering iron located on one side of said base;
  a replaceable fuel supply tank area located on a side of said base opposite from that of said fire box from which area fuel is supplied to said burner, said fuel supply tank area positioning the fuel supply tank at least partially above the vertical level of the heating nozzle of said burner during use of the device;
  a laterally extended heat shield means associated with said base between said fuel supply area and said fire box, said shield means comprising an upwardly extending member having an extended surface extending both laterally and upwardly for separating physically the side-by-side configured fuel supply area and fire box for protecting the fuel supply area form the radiated heat of said fire box; and
  carrying handle means associated with said base for carrying the portable device about by hand.

13. The heating device of claim 12 wherein said handle and said heat shield means form a combined, integral structure.

14. The heating device of claim 13 wherein said fire box is made only of sheet metal materials.

* * * * *